(No Model.) 10 Sheets—Sheet 1.
T. B. REDMOND & S. Z. RUFF.
GRADING AND EXCAVATING DEVICE.

No. 544,051. Patented Aug. 6, 1895.

Witnesses
Percy C. Bowen
J. C. Wilson

Inventors
T. B. Redmond +
Solon Z. Ruff,
By Whitman & Wilkinson
Attorneys.

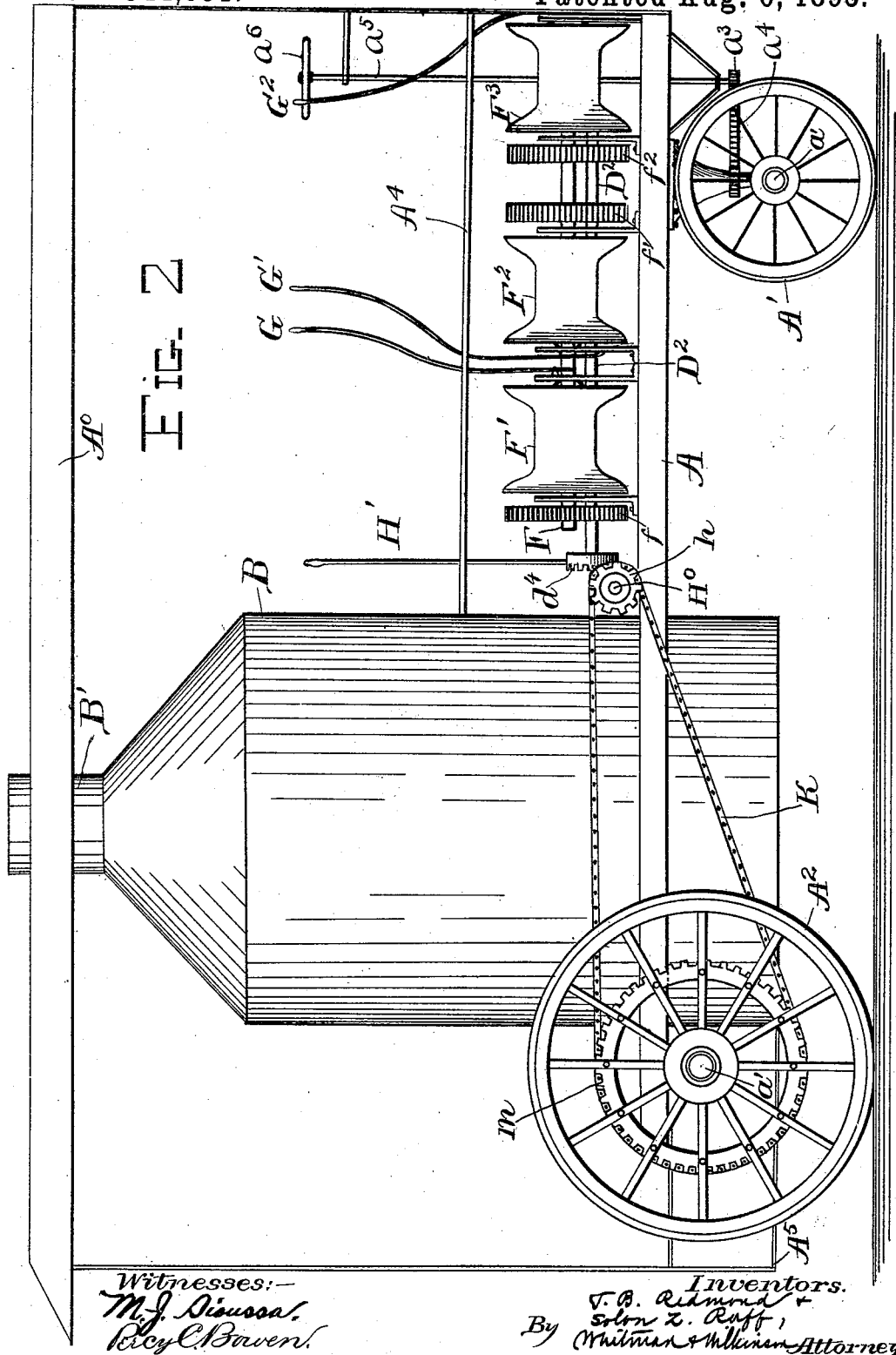

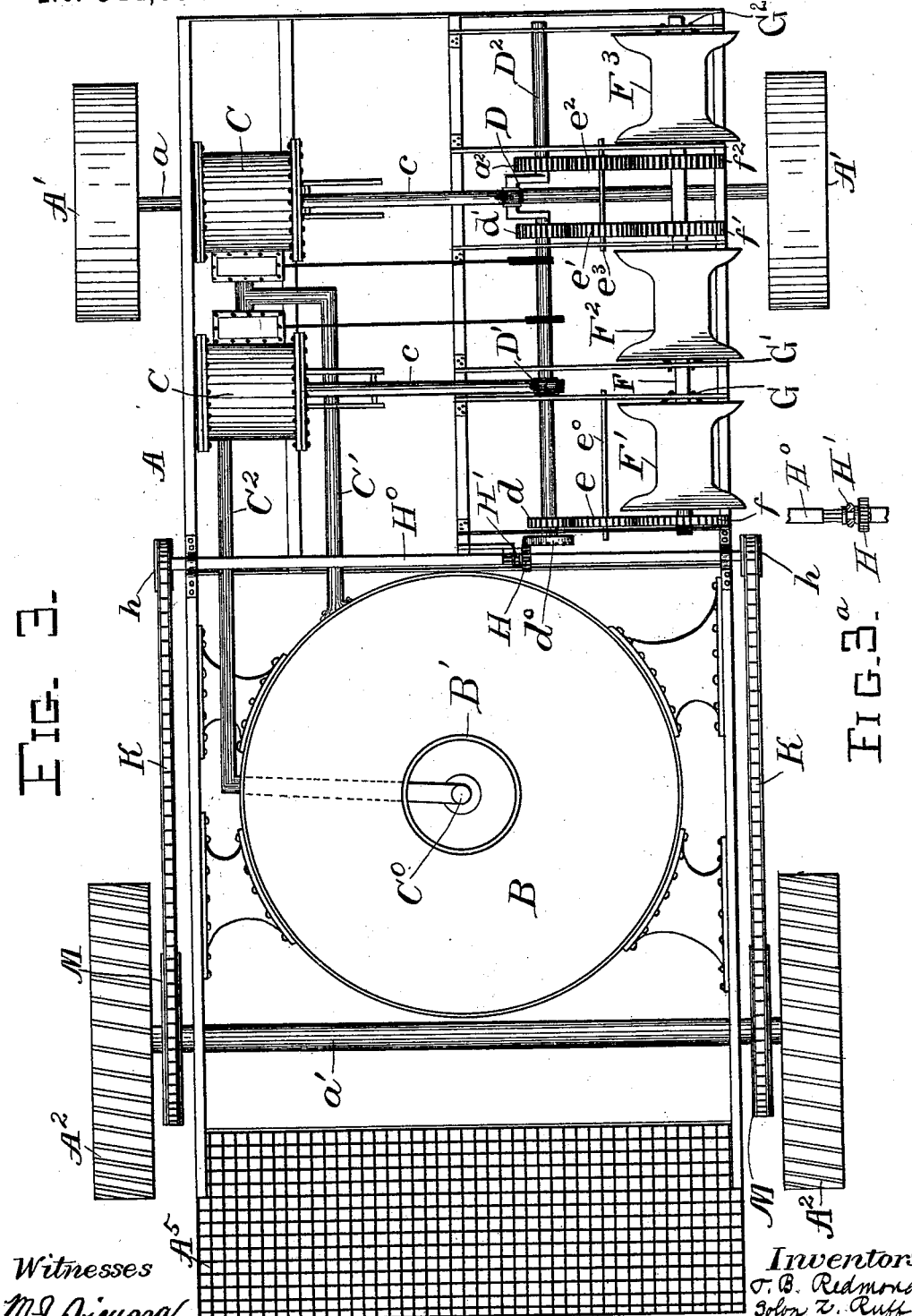

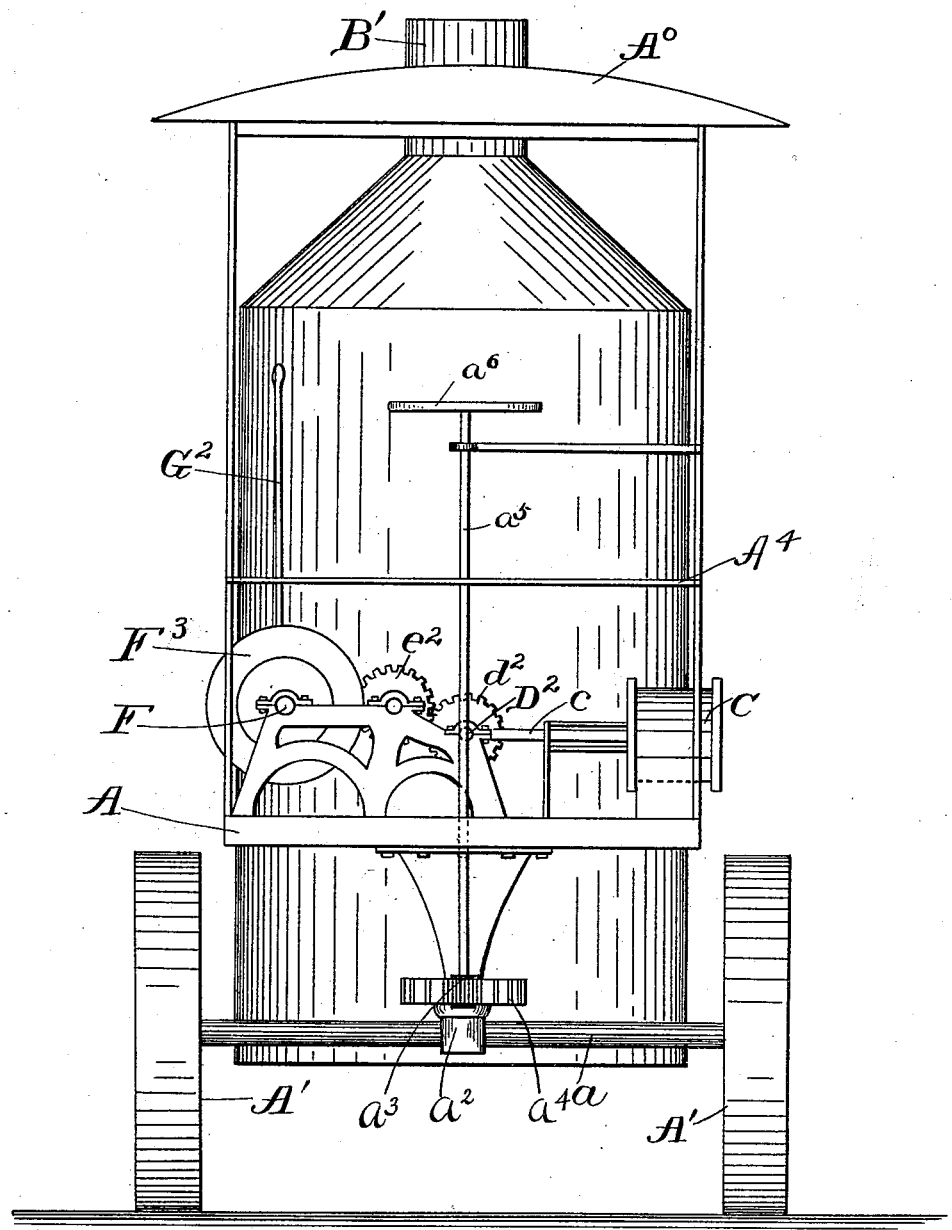

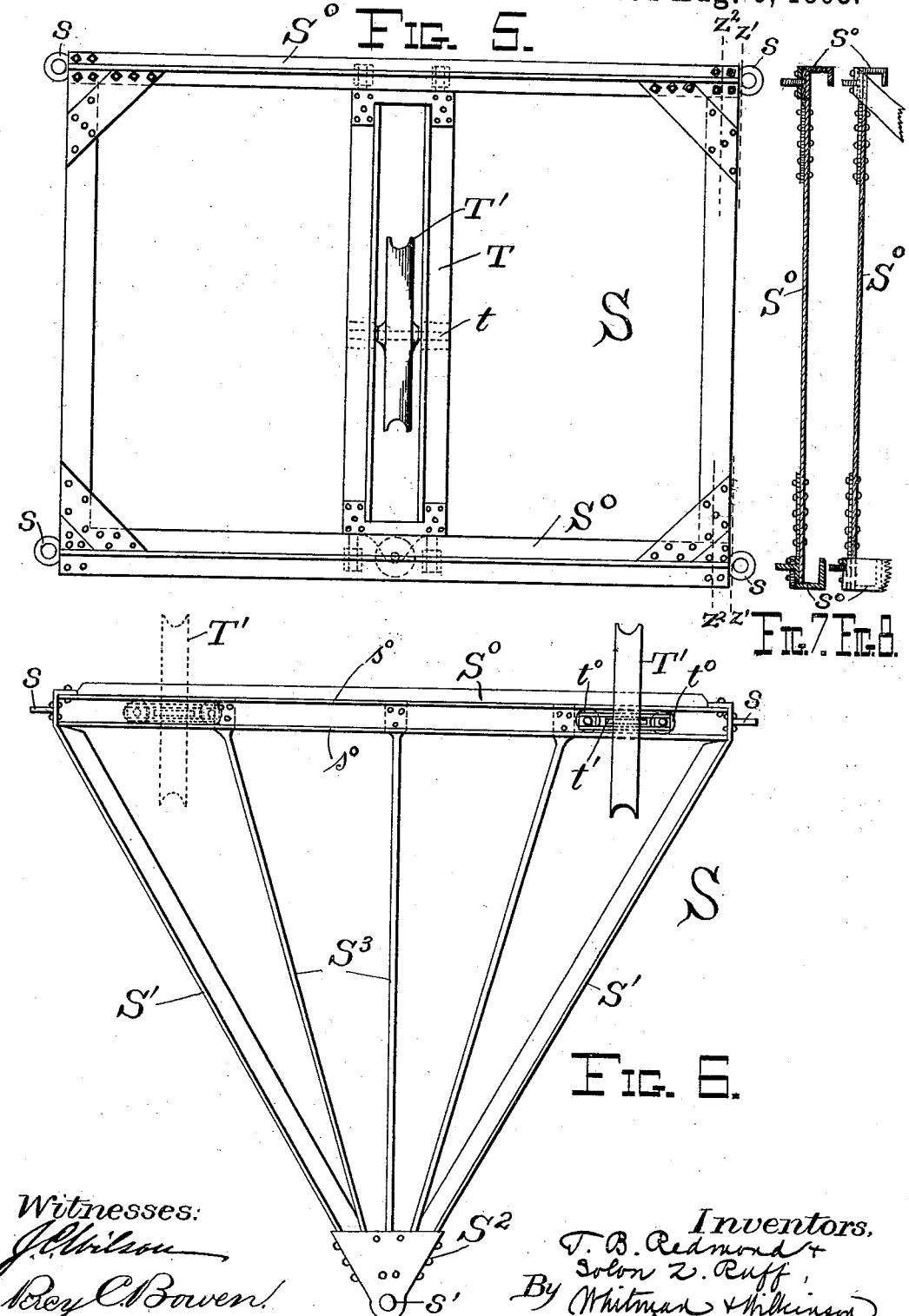

(No Model.) 10 Sheets—Sheet 6.
T. B. REDMOND & S. Z. RUFF.
GRADING AND EXCAVATING DEVICE.
No. 544,051. Patented Aug. 6, 1895.
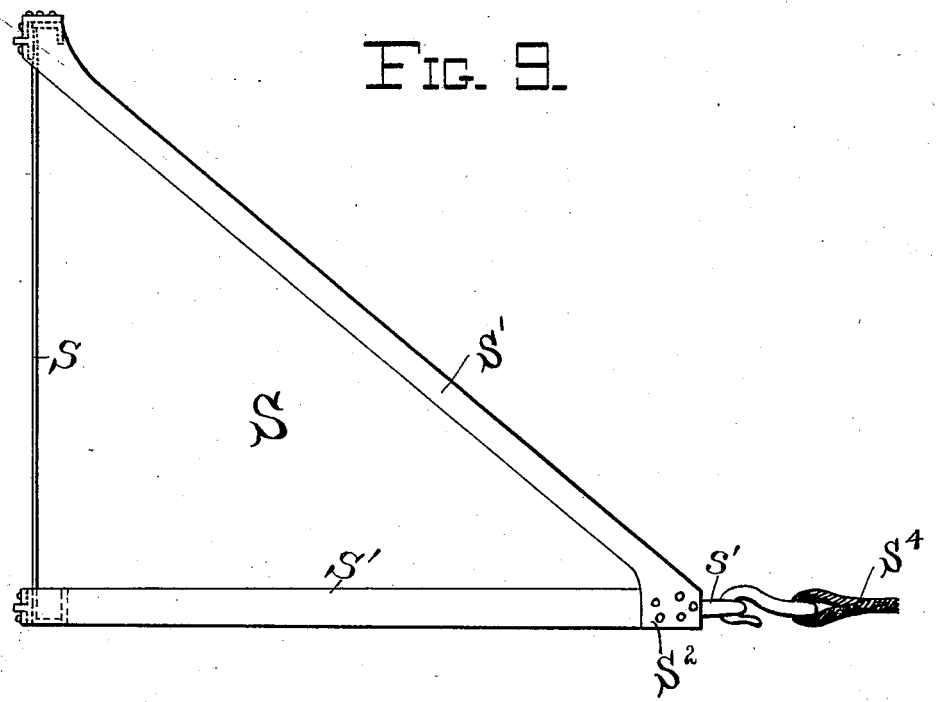
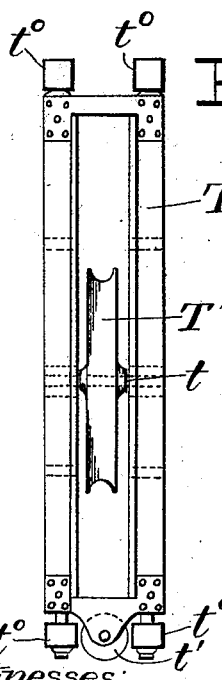
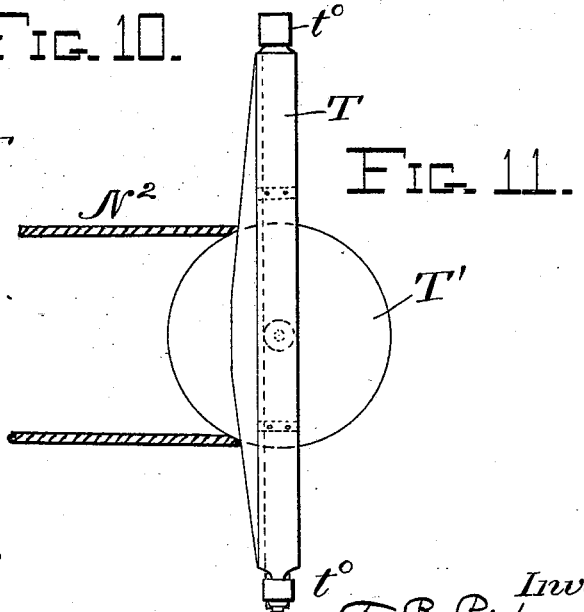
Witnesses:
Inventors
T. B. Redmond &
Solon Z. Ruff,
By Whitman & Wilkinson,
Attorneys.

(No Model.) 10 Sheets—Sheet 7.

T. B. REDMOND & S. Z. RUFF.
GRADING AND EXCAVATING DEVICE.

No. 544,051. Patented Aug. 6, 1895.

Witnesses.
J. C. Wilson.
Percy O. Bowen.

Inventors.
T. B. Redmond &
Solon Z. Ruff
by
Whitman & Wilkinson
Attorneys.

(No Model.) 10 Sheets—Sheet 8.
T. B. REDMOND & S. Z. RUFF.
GRADING AND EXCAVATING DEVICE.
No. 544,051. Patented Aug. 6, 1895.
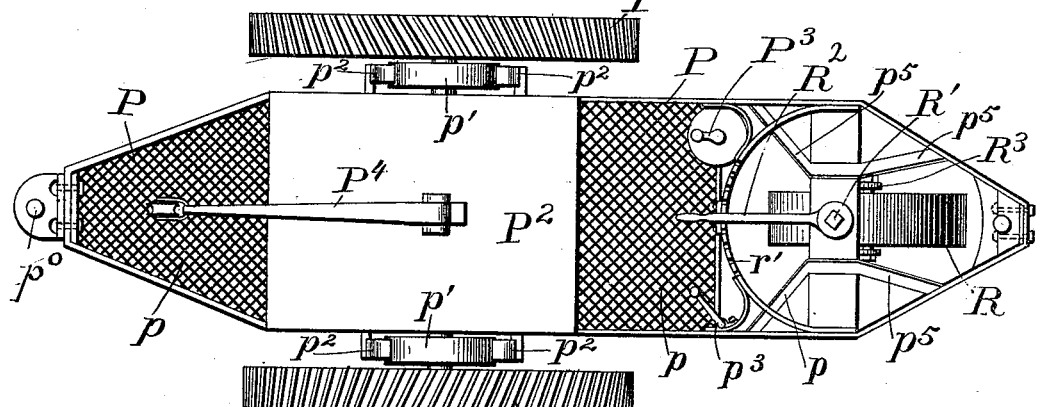
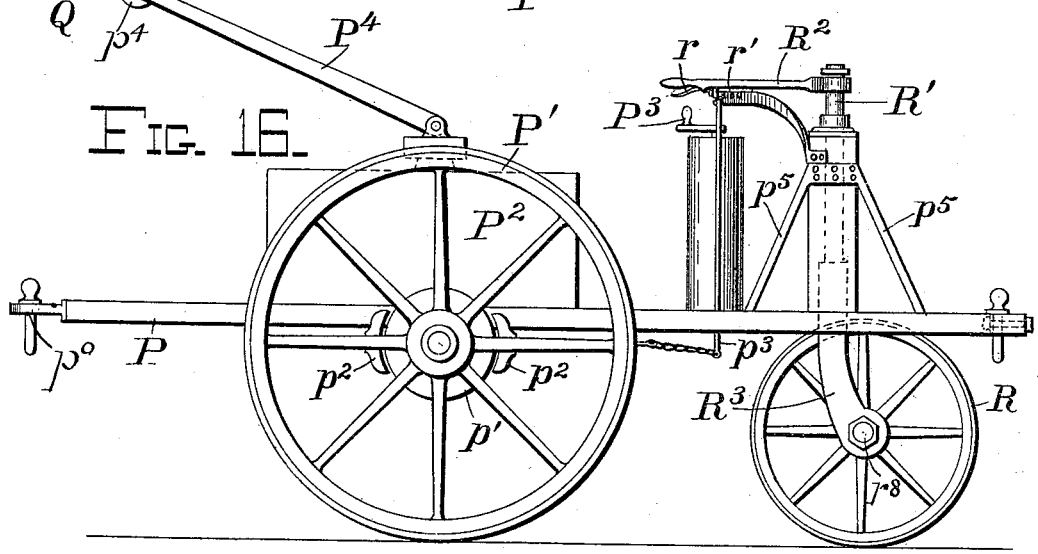
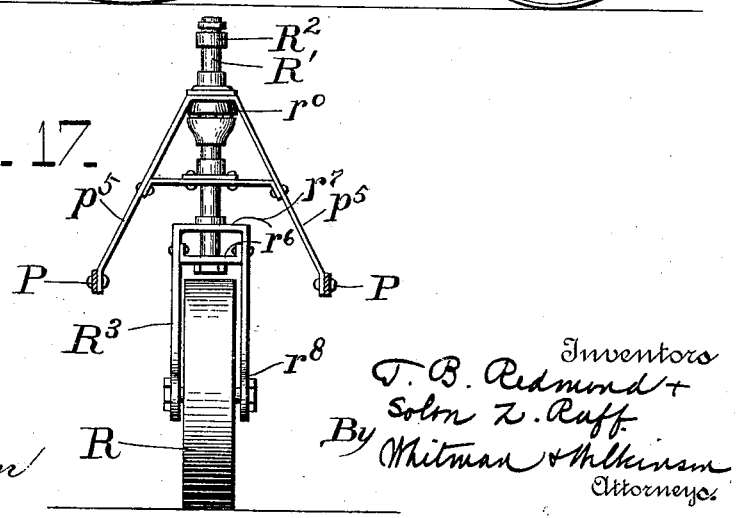
Witnesses
J. C. Wilson
Rey C. Bowen
Inventors
T. B. Redmond +
Solon Z. Ruff
By Whitman & Wilkinson
Attorneys

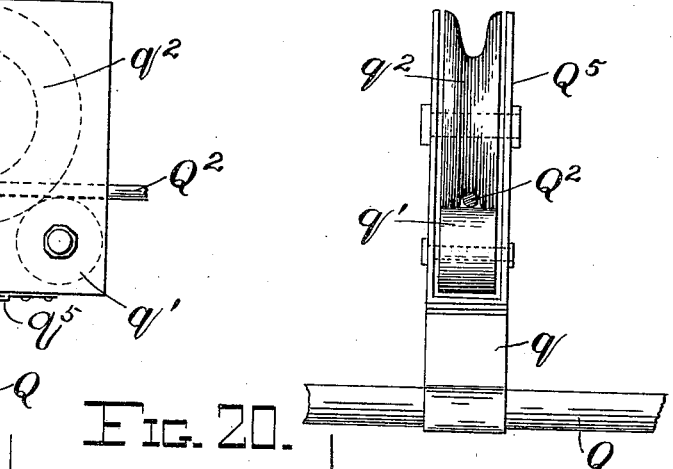
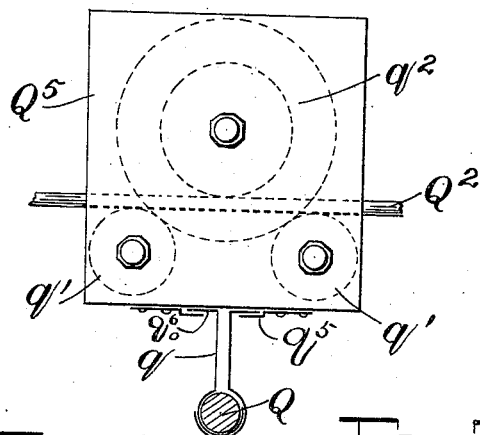
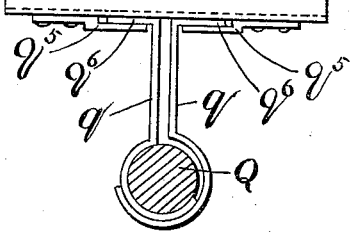
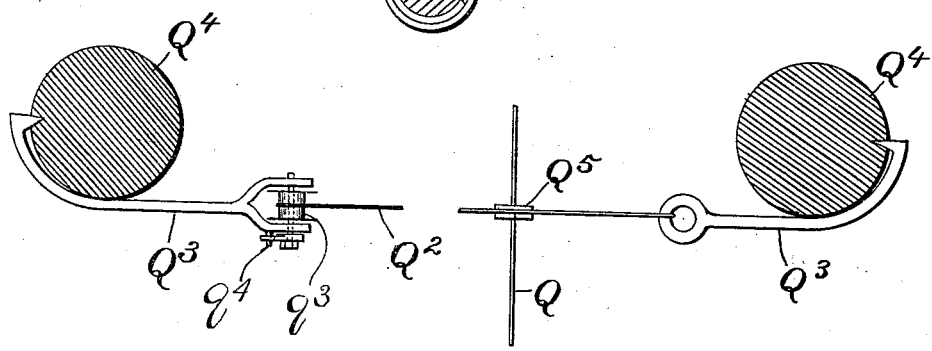

(No Model.) 10 Sheets—Sheet 10.
T. B. REDMOND & S. Z. RUFF.
GRADING AND EXCAVATING DEVICE.

No. 544,051. Patented Aug. 6, 1895.

Witnesses
Inventors
T. B. Redmond &
Solon Z. Ruff,
By Whitman & Wilkinson
Attorneys

UNITED STATES PATENT OFFICE.

THOMAS B. REDMOND, OF CHATTANOOGA, TENNESSEE, AND SOLON Z. RUFF, OF ATLANTA, GEORGIA.

GRADING AND EXCAVATING DEVICE.

SPECIFICATION forming part of Letters Patent No. 544,051, dated August 6, 1895.

Application filed December 18, 1894. Serial No. 532,248. (No model.)

*To all whom it may concern:*

Be it known that we, THOMAS B. REDMOND, a resident of Chattanooga, in the county of Hamilton and State of Tennessee, and SOLON Z. RUFF, a resident of Atlanta, in the county of Fulton and State of Georgia, citizens of the United States, have invented certain new and useful Improvements in Grading and Excavating Systems; and we do hereby declare the following to be a full, clear, and exact description of the invention, such as will enable others skilled in the art to which it appertains to make and use the same.

Our invention relates to improvements in mechanical systems for excavating and grading. It is intended for use in priable soil—such as sand, clay, "hard-pan," and the like—and parts of the same may be used in the handling of rock, lumber, &c.

Our invention will be more readily understood by reference to the accompanying drawings, in which the same parts are indicated by the same letters throughout the several views.

Figure 1:
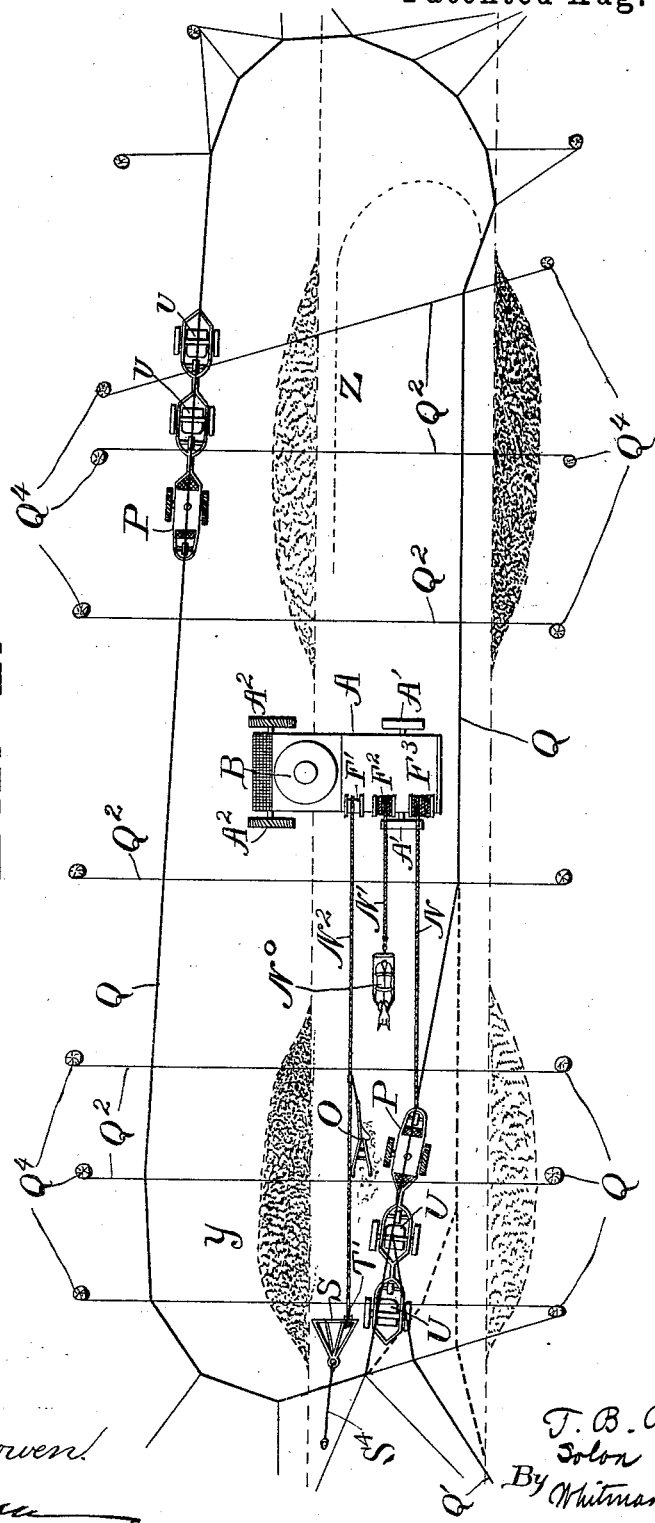
Figure 12:
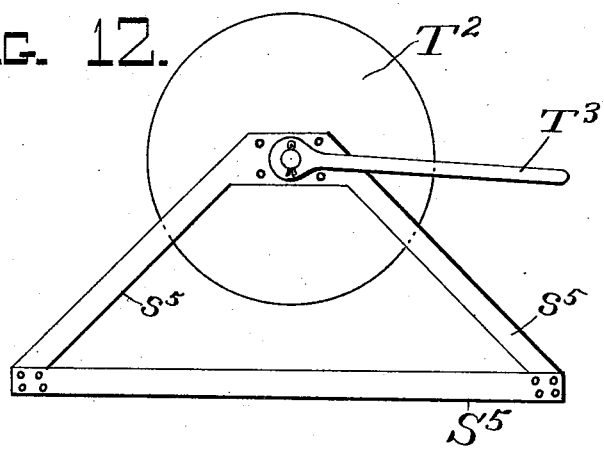
Figure 13:
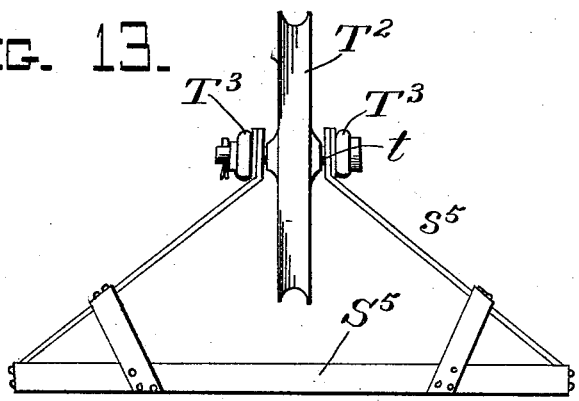
Figure 14:
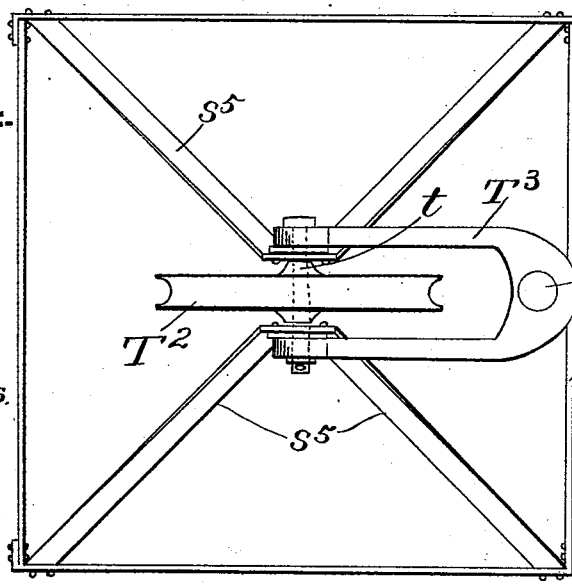
Figure 22:
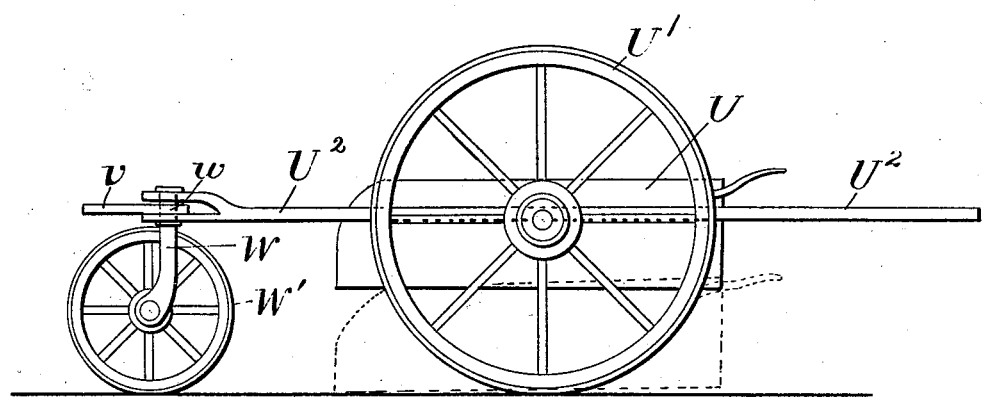
Figure 23:
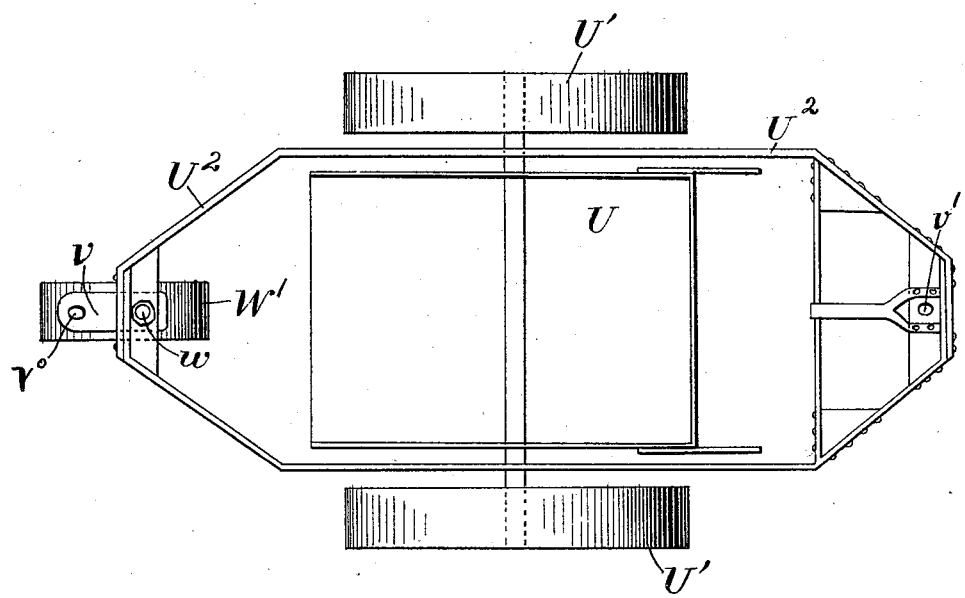

Figure 1 represents a diagrammatic plan view of the entire apparatus except the generator of electricity. The various details of the said figure are not drawn to scale in order that the features may be brought out with more clearness. Fig. 2 represents a side elevation of a portable steam-engine adapted for use in the apparatus. Fig. 3 represents a plan view of the engine shown in Fig. 2, except that the roof has been removed. Fig. 3ª is a detail view of the clutch device. Fig. 4 represents a front view of the engine shown in Figs. 2 and 3. Fig. 5 represents a front view of an improved form of dead-man. Fig. 6 represents a plan view of the device shown in Fig. 5. Fig. 7 represents a section along the line $z^2 z^2$ of Fig. 5. Fig. 8 represents a section along the line $z' z'$ of Fig. 5. Fig. 9 represents a side elevation of the frame of the dead-man, the movable pulley being omitted, together with the frame for the same. Fig. 10 represents a front view of the movable pulley with its frame as detached from the device shown in Fig. 9. Fig. 11 represents a side elevation of the movable pulley and its frame. Fig. 12 represents a side elevation of a modified form of dead-man in which the pulley is not movable except in conjunction with the frame. Fig. 13 is an end view of the device shown in Fig. 12, as seen from the left of the said figure; and Fig. 14 represents a plan view of the device shown in Figs. 12 and 13. Fig. 15 represents a plan view of the electric locomotive used in our improved apparatus. Fig. 16 represents a side elevation of the said locomotive; and Fig. 17 is a detail view, as seen from the front, of the guiding-wheel of the electric locomotive. Fig. 18 represents a side elevation of a traveling support for the conducting-wire along which the trolley travels. Fig. 19 is an end view of the device shown in Fig. 18. Fig. 20 represents a detail view of the sister hooks for supporting the conducting-wire. Fig. 21 represents a plan view of the cross-wire and attachments along which the traveling support for the conducting-wire is caused to travel. Fig. 22 represents a side elevation of one of the scrapers used in connection with our apparatus, and Fig. 23 represents a plan view of the scraper shown in Fig. 22.

A represents the truck of the portable steam-engine, on which the boiler, cylinders, drums, and other operative parts are mounted. This truck is mounted upon the wheels A' and A² on the axles $a$ and $a'$, and it is provided with a grating A⁵ for the fireman, platform A⁴ for the engineer, and a roof A⁰. The front axle moves on a pivot $a^2$, and is turned to the desired angle by means of the pinion $a^3$, which gears in the quadrantal rack $a^4$. This pinion is operated by shaft $a^5$ and hand $a^6$, whereby the direction of the portable steam-engine may be guided at will.

The boiler B, mounted on the truck A, is provided with a smoke-stack B', into which the exhaust-steam from the cylinders C is fed by means of the escape-pipe C² and the vertical pipe C⁰. In this way a forced draft is secured. Steam is supplied to the cylinders through the feed-pipe C'.

The various valves for controlling the supply of steam to the cylinders and the various other well-known attachments to the boiler are omitted as unnecessary in the drawings, not being a part of our invention and being well known in the art.

The piston-rods $c$ of the cylinders C are connected to the crank D and D, which drive the shaft $D^2$, on which are placed the three pinions $d, d'$, and $d^2$. These pinions mesh in the idle-gears $e, e'$, and $e^2$, which are mounted on the shaft $e^0$ and $e^3$, as shown most clearly in Fig. 3. These idle-gears drive the gear-wheels $f, f'$, and $f^2$ on the shaft F, and thus revolve the said shaft. It will be obvious that a single train of gearing connecting the shafts $D^2$ and F might be used in the place of the three separate trains of gearing shown in Fig. 3, and that various other modifications in driving the shaft F from the shaft $D^2$ might be made.

The drums $F', F^2$, and $F^3$ are loosely mounted on the shaft F, and are connected to the said shaft, when desired, by means of the clutch-couplings $G, G'$, and $G^2$, which clutch-couplings may be of any preferred type. By means of the various independent clutch-couplings any one or more of the drums may be rigidly attached to the shaft F and caused to revolve therewith. Thus it will be seen that motion can be transmitted from the shaft $D^2$ to any one or more of the drums. This shaft $D^2$ may be also made to propel the truck A, as will be hereinafter described. Mounted on the end of the said shaft $D^2$ is a crown-wheel $d^0$, which meshes in the pinion H, which slides in a keyway on the shaft $H^0$, and is moved into or out of the operative position by means of the hand-rod H'. On this shaft $H^0$ are two sprocket-wheels $h$, which mesh in the sprocket-chains K, which drive the sprocket-wheels M, fast to the rear axle $a'$. It will thus be seen that the cylinders C may be used either to propel the truck or to operate the drums.

N represents a rope, preferably made of wire, adapted to wind upon the drum $F^3$ and to be used as a drag for loading the scrapers in connection with the electric locomotive.

N' represents a rope, also preferably made of wire, which may be used alternatively or in conjunction with the rope N, and it winds upon the drum $F^2$. This rope would be ordinarily drawn out for one train of scrapers, as by a horse $N^0$, while the other rope N was in use dragging a loaded train or loading a train of scrapers.

The rope $N^2$ is preferably an endless wire which takes one or more turns round the drum F', and passes around the movable pulley T' of the dead-man S. This rope drags the plow O backward and forward and prepares the ground for the scrapers. In order that the plow may be laterally movable, for instance to avoid stumps, rocks, or other obstructions, the pulley T' is preferably made so as to be vertically and laterally movable in the dead-man S. This is accomplished by the structure shown in Figs. 5 to 11, inclusive. In these figures the dead-man S is provided with two plates $S^0$, having channel-irons $s^0$ connected thereto, which serve as guideways for the rollers $t^0$ of the frame T in which the pulley T' is mounted. The weight of this frame T is supported on the roller $t'$, which thus renders a transverse motion of the said frame much freer than would otherwise be the case. This pulley T' is mounted on a shaft $t$ journaled in the frame T, which carries the anti-friction-rollers $t^0$. The said rollers travel up and down between the guides $s^0$, as shown in Fig. 6. Thus it will be seen that the frame T is free to move transversely between the plates $S^0$, while the pulley T' is free to move vertically in the frame T, and thus the direction of the rope $N^2$ will automatically adjust itself upon the imposition of the requisite amount of pressure on the said rope at the plow O.

The dead-man S is provided with the ordinary anchor-bolts $s$, and the eye $s'$, secured to the cap $S^2$, provides a suitable bearing for the hook at the end of the stay-rope $S^4$. Suitable stays S' and $S^3$ connect the cap $S^2$ with the frame at the face of the dead-man.

In the form of dead-man shown in Figs. 12 to 14, $S^5$ represents a quadrangular frame, to which are connected inclined struts $s^5$, in the top of which the shaft $t$ of the pulley $T^2$ is journaled. $T^3$ represents a link provided with an eye $t^3$ for the hook of the stay-rope. This form of dead-man is secured to the ground by means of stakes, or in any other convenient way, and is stayed by means of the link $T^3$ and the stay-rope aforesaid.

In the electric locomotive shown in Figs. 15 to 17, P represents a frame sloping at both ends and provided with gratings $p$ for the operator to stand upon. The electric motor for driving this locomotive is carried in the box $P^2$, and may be of any well-known type. On the axle of the traction-wheels P' are mounted brake-wheels $p'$, adapted to be borne against by the brake-shoes $p^2$, which are operated by the hand-rod $p^3$.

$P^4$ represents the trolley for carrying the electric current from the conducting-wire Q to the electric motor, and $P^3$ represents the switch or rheostat for regulating the admission of the current to the motor and the velocity of the said motor.

At the rear end of the electric locomotive the coupling $P^0$ is provided for coupling on to the scraper next in rear.

The direction of the electric locomotive is regulated by the guide-wheel R, mounted on the shaft $r^8$ between the arms of the fork $R^3$. The said fork $R^3$ is secured by means of the cross-piece $r^6$ and $r^7$ to the lower end of the guide-post R'. This guide-post is rigidly attached to the said fork in any convenient way. The upward thrust on this guide-post $R^5$ is taken up by means of the bearing $r^0$, which should preferably be either a ball or roller bearing, the upper member of which is rigidly attached to the braces $p^5$, secured to the frame P. The upper end of the guide-post R' carries a hand-lever $R^2$ with a ratchet $r$ adapted to engage at any desired portion of the circular rack $r'$, as shown in Figs. 15 and 16. By means of the hand-lever R² the wheel R may be set at any desired angle and the electric locomotive may be readily guided at will.

The trolley P⁴, which is provided with a grooved roller p⁴, should be made sufficiently stout to guide the conducting-wire Q laterally. This conducting-wire Q is fed by means of the wire Q' with electricity from the generator, which latter is not shown. The said wire Q is suspended by means of the sister hooks q beneath the frame Q⁵, which frame is made of a single plate of metal bent into a rectangular trough and is provided with a grooved roller q² and plain rollers q', adapted to receive between them the transverse guide-wires Q² on which the said frame Q⁵ is free to move laterally. Beneath the frame Q⁵ are guides q⁵, beneath which the rectangular arms q⁶ of the sister hooks q are detachably held. These rollers q' and q² should be made of porcelain or other suitable non-conducting material to prevent the escape of current by the wires Q². These wires Q² are detachably connected by means of the dogs Q³ to the posts Q⁴. Whenever practicable advantage should be taken of the fact that there are trees or saplings available for use in place of the posts Q⁴. One of these dogs Q³ is provided with a drum q³, with a hand-crank q⁴ for winding up the drum, whereby the cross-wires Q² may be wound or unwound to the requisite tension, as may be required. Hemp or other rope may be substituted for the cross-wires Q², if desired.

It will be seen that if the electric locomotive be guided in any direction beneath these cross-wires Q² that the trolley will cause the conducting-wire Q to slide backward or forward beneath these wires Q², and will thus enable a continuous supply of electricity to be furnished to the electric motor without shifting the trolley, while at the same time the electric locomotive will be enabled to follow any desired path within predetermined limits.

In the form of scrapers shown in Figs. 22 and 23 U represents a scraper-body of ordinary construction mounted upon wheels U', journaled in the frame U². The two ends of this frame are provided with coupling devices v and v'. Of these the coupling device v consists of a plate provided with a pin-hole v⁰ near one end thereof and a tenon near the other end adapted to receive the angular head w of the fork W, which is journaled in the forward end of the scraper-frame and carries journaled in the said fork the guide-wheel W'. The plate v is coupled either to the rear end of the electric locomotive or to the rear end of the scraper next in front, as shown in Fig. 1. It will be seen that whatever the direction of the motive power in front, there will be a tendency to swing this plate v by reason of its being rigidly fastened to the front fork to correspond to that direction, thereby turning the wheel W through such an angle as to guide the scraper in the direction that it should follow.

The operation of the system is as follows: The conducting-wire Q being arranged over an elliptical or oblong track, the steam-engine being arranged across the track, and the deadman being placed in position at or near the cutting, in somewhat similar relations to those shown in Fig. 1, suppose it is desired to make a cutting at Y and an embankment at Z of the said Fig. 1. The ground is broken up by the plow O, and then the scoops are dragged along and filled by means of the electric locomotive supplemented, or not, by one or both of the ropes N and N'. For filling the scrapers and transporting them while loaded it will generally be necessary to assist the electric locomotive by power from the steam-engine through the medium of one or both of the ropes referred to; but it will generally be practicable to take advantage of the slope of the ground in running the loaded scrapers from a higher cutting to a lower embankment. As the electric locomotive nears the point where it is desired to dump the scrapers, it is guided in the proper direction by means of the hand-lever R², as has been already described. After dumping the scrapers, the empty train may be carried back to the cutting either by having the wire Q make a detour, as shown in Fig. 1, or by having it go directly back along the top of the embankment, as shown in dotted lines in the said figure. The electric locomotive and train of scrapers will serve to pack the embankment and render it sufficiently firm for these vehicles to travel thereover without the intervention of any tracks specially prepared for the purpose. The number of scrapers attached to the electric locomotive and the number of trains in operation at the same time will depend upon the motive power available, the character of the soil and of the road-bed, and various other conditions of the particular work.

By the herein described apparatus, the necessity for by far the greater portion of manual labor now required in grading and filling will be done away with, and greatly improved results will be secured at much less cost. These, as the various other advantages of the herein-described system, will readily suggest themselves to any practical railroad contractor.

It will be obvious that many modifications of the herein-described apparatus might be made which could be used without departing from the spirit of our invention.

Having thus described our invention, what we claim, and desire to secure by Letters Patent of the United States, is—

1. In an apparatus of the character described, the combination with a dirigible electric locomotive, and a trolley carried thereby, of a source of electricity, and a laterally movable conducting wire receiving its current therefrom, a plurality of transverse supporting wires stretched above said conducting wire, and a frame provided with an upper grooved roller and lower guide rollers all of said rollers being made of insulating material, and the said rollers being adapted to receive the said transverse wire and to travel thereon, and supporting said conducting wire, substantially as described.

2. In an apparatus of the character described, the combination with a dirigible electric locomotive, and a trolley carried thereby, of a source of electricity, and a laterally movable conducting wire receiving its current therefrom, a plurality of transverse supporting wires stretched above said conducting wire, and a frame provided with an upper grooved roller and lower guide rollers all of said rollers being made of insulating material, and the said rollers being adapted to receive the said transverse wire and to travel thereon, and sister hooks suspended from said frame and inclosing and supporting said conducting wire, substantially as described.

3. In an apparatus of the character described, the combination with an endless drag rope, means for propelling the same, of a deadman provided with a vertically and laterally movable pulley adapted to receive the said drag rope, substantially as and for the purposes described.

4. In an apparatus of the character described, a deadman comprising a frame with guideways therein and means for securing the said frame in position, of a second frame provided with antifriction rollers and adapted to slide laterally in said outer frame, the said inner frame being itself provided with guideways, and a wheeled frame traveling in said inner guideways and carrying the pulley, substantially as and for the purposes described.

5. An apparatus for excavating and grading, comprising a source of electricity; a laterally movable conducting wire; an electric locomotive, a trolley attached to said locomotive and adapted to move said conducting wire laterally, and thus allow changes in the route of said locomotive; excavating devices attached to said electric locomotive; an engine provided with a plurality of drums, and ropes adapted to connect one or more of said drums to said locomotive, substantially as described.

6. An apparatus for excavating and grading, comprising a continuous conducting wire arranged in a closed system, laterally movable overhead supports connected to various parts of said conducting wire and supporting the same, a source of electricity connected to said conducting wire; an electric locomotive, a trolley attached to said locomotive and adapted to move said conducting wire laterally, and thus allow changes in the route of said locomotive, excavating devices attached to said electric locomotive; an engine provided with a plurality of drums, and ropes adapted to connect one or more of said drums to said locomotive, substantially as described.

7. An apparatus for excavating and grading, comprising a continuous conducting wire arranged in a closed system; cross wires above said conducting wire and suspended from suitable supports, insulated movable carriers free to travel on said cross wires and supporting said conducting wire; a source of electricity connected to said conducting wire; an electric locomotive; a trolley attached to said locomotive and adapted to move said conducting wire laterally, and thus allow changes in the route of said locomotive; excavating devices attached to said electric locomotive; an engine provided with a plurality of drums, and ropes adapted to connect one or more of said drums to said locomotive, substantially as described.

8. An apparatus for excavating and grading, comprising a source of electricity; a laterally movable conducting wire; an electric locomotive; a trolley attached to said locomotive and adapted to move said conducting wire laterally, and thus allow changes in the route of said locomotive; excavating devices attached to said electric locomotive; an engine provided with a plurality of drums, and ropes adapted to connect one or more of said drums to said locomotive; a plow; a deadman, and an endless rope connecting said plow with said deadman, substantially as and for the purposes described.

9. An apparatus for excavating and grading, comprising a continuous conducting wire arranged in a closed system; laterally movable overhead supports connected to various parts of said conducting wire and supporting the same; a source of electricity connected to said conducting wire; an electric locomotive, a trolley attached to said locomotive and adapted to move said conducting wire laterally, and thus allow changes in the route of said locomotive, excavating devices attached to said electric locomotive; an engine provided with a plurality of drums, and ropes adapted to connect one or more of said drums to said locomotive; a plow; a deadman, and an endless rope connecting said plow with said deadman, substantially as and for the purposes described.

10. An apparatus for excavating and grading, comprising a continuous conducting wire arranged in a closed system; cross wires above said conducting wire and suspended from suitable supports, insulated movable carriers free to travel on said cross wires and supporting said conducting wire; a source of electricity connected to said conducting wire; an electric locomotive; a trolley attached to said locomotive and adapted to move said conducting wire laterally, and thus allow changes in the route of said locomotive; excavating devices attached to said electric locomotive; an engine provided with a plurality of drums, and ropes adapted to connect one or more of said drums to said locomotive; a plow; a deadman, and an endless rope connecting said plow with said deadman, substantially as and for the purposes described.

11. An apparatus for excavating and grading, comprising a source of electricity; a laterally movable conducting wire; an electric locomotive; a trolley attached to said locomotive and adapted to move said conducting wire laterally, and thus allow changes in the route of said locomotive; excavating devices attached to said electric locomotive; an engine provided with a plurality of drums, and ropes adapted to connect one or more of said drums to said locomotive; a plow; a deadman provided with a vertically and laterally movable pulley, and an endless rope connecting said plow with said pulley, substantially as and for the purposes described.

12. An apparatus for excavating and grading, comprising a continuous conducting wire arranged in a closed system; laterally movable overhead supports connected to various parts of said conducting wire and supporting the same; a source of electricity connected to said conducting wire; an electric locomotive; a trolley attached to said locomotive and adapted to move said conducting wire laterally, and thus allow changes in the route of said locomotive; excavating devices attached to said electric locomotive; an engine provided with a plurality of drums, and ropes adapted to connect one or more of said drums to said locomotive; a plow; a deadman provided with a vertically and laterally movable pulley; and an endless rope connecting said plow with said pulley, substantially as and for the purposes described.

13. An apparatus for excavating and grading, comprising a continuous conducting wire arranged in a closed system; cross wires above said conducting wire and suspended from suitable supports, insulated movable carriers free to travel on said cross wires and supporting said conducting wire; a source of electricity connected to said conducting wire; an electric locomotive; a trolley attached to said locomotive and adapted to move said conducting wire laterally, and thus allow changes in the route of said locomotive; excavating devices attached to said electric locomotive; an engine provided with a plurality of drums, and ropes adapted to connect one or more of said drums to said locomotive; a plow; a deadman provided with a vertically and laterally movable pulley, and an endless rope connecting said plow with said pulley, substantially as and for the purposes described.

14. In an apparatus of the character described, the combination with a dirigible electric locomotive, and a trolley carried thereby, of a source of electricity, and a laterally movable conducting wire receiving its current therefrom, a plurality of transverse supporting wires stretched above said conducting wire, and movable carriers traveling along said transverse wires and insulated therefrom, and sister-hooks detachably connected to said carriers and supporting said conducting wire, substantially as described.

15. In an apparatus of the character described, the combination with a dirigible locomotive, and a trolley carried thereby, of a source of electricity, and a laterally movable conducting wire receiving its current therefrom, a plurality of transverse supporting wires stretched above said conducting wire, and a frame provided with an upper grooved roller and lower guide rollers all of said rollers being made of insulating material, and the said rollers being adapted to receive the said transverse wire and to travel thereon, guides attached to the bottom of said frame and sister-hooks provided with holding arms adapted to slide into said guides, the said hooks supporting said conducting wire, substantially as described.

16. In an apparatus of the character described, the combination with a dirigible electric locomotive, and a trolley carried thereby, of a source of electricity, and a laterally movable conducting wire receiving its current therefrom, a plurality of transverse supporting wires stretched above said conducting wire, and a frame provided with an upper grooved roller and lower guide rollers all of said rollers being made of insulating material, and the said rollers being adapted to receive the said transverse wire and to travel thereon, and sister-hooks detachably connected to and suspended from said frame and inclosing and supporting said conducting wire, substantially as described.

17. In an apparatus of the character described, the combination with a dirigible electric locomotive, and a trolley carried thereby, of a source of electricity, and a laterally movable conducting wire receiving its current therefrom, a plurality of transverse supporting wires stretched above said conducting wire, dogs secured at each end of said wire and adapted to engage in wooden supports therefor, and movable carriers traveling along said transverse wires and supporting said conducting wire, substantially as described.

18. In an apparatus of the character described, a deadman comprising a vertical frame with guideways therein; braces connected to said frame and means for securing the said frame in position, of a second frame provided with antifriction rollers and adapted to slide laterally in said outer frame, the said inner frame being itself provided with guideways, and a wheeled frame also provided with antifriction rollers and traveling in said inner guide ways, and a grooved pulley journaled in said inner frame, substantially as and for the purposes described.

19. In a scraper for use in apparatus of the character described, the combination with a frame and a scraper body, mounted thereon of two wheels one at either side thereof and supporting the same; a fork journaled in the forward portion of said scraper frame and a guide wheel journaled in said fork, and a coupling link rigidly attached to said fork and adapted to turn said fork and said guide wheel in the direction of the draft strain, substantially as and for the purposes described.

In testimony whereof we affix our signatures in presence of two witnesses.

THOMAS B. REDMOND.
SOLON Z. RUFF.

Witnesses:
JOHN C. WILSON,
HARRY Y. DAVIS.